(12) United States Patent
Osipchuk

(10) Patent No.: US 8,665,500 B2
(45) Date of Patent: Mar. 4, 2014

(54) VIBRATION CONTROL IN SCANNERS

(75) Inventor: Yuri Vladimirovich Osipchuk, Foster City, CA (US)

(73) Assignee: Molecular Devices, LLC, Sunnyvale, CA (US)

( * ) Notice: Subject to any disclaimer, the term of this patent is extended or adjusted under 35 U.S.C. 154(b) by 710 days.

(21) Appl. No.: 12/937,233

(22) PCT Filed: Apr. 13, 2009

(86) PCT No.: PCT/US2009/040382
§ 371 (c)(1),
(2), (4) Date: Dec. 16, 2010

(87) PCT Pub. No.: WO2009/126961
PCT Pub. Date: Oct. 15, 2009

(65) Prior Publication Data
US 2011/0109946 A1 May 12, 2011

Related U.S. Application Data

(60) Provisional application No. 61/044,439, filed on Apr. 11, 2008.

(51) Int. Cl.
*H04N 1/04* (2006.01)

(52) U.S. Cl.
USPC .......................................... 358/474; 358/471

(58) Field of Classification Search
USPC .................. 358/471, 474, 400, 401, 501, 486; 382/312; 356/23–26
See application file for complete search history.

(56) References Cited

U.S. PATENT DOCUMENTS 6,693,402 B2 * 2/2004 Ebihara et al. ................ 318/649
2012/0092461 A1 * 4/2012 Fisker et al. .................... 348/46

* cited by examiner

*Primary Examiner* — Cheukfan Lee
(74) *Attorney, Agent, or Firm* — Bella Fishman

(57) ABSTRACT

A scanning apparatus (200) includes a chassis (102), an actuator (104) that moves along a first axis (106, 110) with respect to the chassis, and a scanning head, e.g., an optical scanning head (108), that is mechanically coupled to the actuator and that moves along a second axis that is the same as or substantially parallel to the first axis. Methods of controlling vibration in a scanning apparatus include moving the actuator along the first axis and moving the scanning head along the second axis such that the actuator functions as a counterbalance weight for the moving scanning head, thereby reducing vibration in the scanning apparatus by decoupling translation of the actuator from the chassis.

22 Claims, 3 Drawing Sheets

VIBRATION CONTROL IN SCANNERS

RELATED APPLICATIONS

This application claims priority from U.S. Provisional Patent Application No. 61/044,439, filed on Apr. 11, 2008, the contents of which are incorporated herein by reference in its entirety.

TECHNICAL FIELD

This invention relates to control of vibration in scanners, such as optical scanners.

BACKGROUND

Actuators can be employed to provide a scanning mechanism in scanners, such as optical scanners, e.g., gene chip scanners and imaging scanners. In such applications, a scanning head, such as an optical scanning head can be coupled to an actuator, such as a voice coil actuator, which moves the scanning head along a translation axis, typically in a cyclical or back and forth motion. This movement can be coupled to movement about another axis, which can be orthogonal to the axis of the first movement, so that the scanning head moves in two dimensions to permit a scan of an area of a sample, e.g., in a raster pattern.

Typically, rapid or cyclical movement in any axis, e.g., cyclic motion in the first axis, can transmit unwanted vibrations to optical or other components in the scanning apparatus, leading to blurring and other scanning distortions. Various methods of reducing vibrations are known, but in relation to optical scanners, many such methods have been impractical, expensive, or insufficiently effective. Thus, vibrations in scanners pose significant technical and economic obstacles to increasing resolution and scanning speed.

SUMMARY

Disclosed herein are new devices and methods that provide effective and economical vibration reduction in scanning systems.

In one aspect, the invention features scanning apparatus that include a chassis; an actuator arranged to move along a first axis with respect to the chassis; and a scanning head, e.g., an optical scanning head, mechanically coupled to the actuator and arranged to move along a second axis that is the same as or substantially parallel to the first axis; wherein the scanning head and the actuator move along the first and second axes such that the moving actuator functions as a counterbalance weight for the moving scanning head, thereby reducing vibration in the scanning apparatus by decoupling translation of the actuator from the chassis.

In these scanning apparatuses, the actuator and scanning head can move at different speeds or the same speed, and the actuator and scanning head can have the same mass or a different mass. For example, the actuator can have a mass at least about ten times greater than a mass of the scanning head.

In certain embodiments, the actuator can be or include a voice coil actuator; a piezoelectric actuator; a motor coupled to a crankshaft or cam; a pneumatic actuator; a motor with a lead screw; a motor with a capstan belt drive; or a motor with a chain-drive, and the actuator can be coupled to the chassis with a coupling element, such as a spring, an elastic bumper, a magnetic field, or a shock absorber.

The optical scanning head can typically include one or more optical scanning elements such as a mirror, a lens, a light source, a filter, a light detector, a light pipe, and the like. In some embodiments, the optical scanning head includes a combination of two or more of the preceding optical elements. For example, in certain embodiments, the optical scanning head includes a mirror and a lens.

In addition, in some embodiments, the apparatus can further include a displacement encoder configured to sense displacement of the scanning head along the second axis. In various embodiments, the displacement encoder can be an optical encoder, a linear variable displacement transducer (LVDT) encoder, a laser differential interferometer, or an inductive proximity sensor. In certain embodiments, the displacement encoder is an optical encoder.

The scanning apparatus can further include a controller electronically linked to the actuator, wherein the controller is programmed to actuate the actuator to move the scanning head along the second axis. The scanning apparatus including a displacement sensor can also further include a controller electronically linked to the actuator and the displacement encoder, wherein the controller is programmed to actuate the actuator to move the scanning head along the second axis in relation to displacement sensed at the displacement encoder.

In certain embodiments the scanning apparatus can further include a translation stage configured to move the actuator and the scanning head together along a third axis, whereby movement of the scanning head along the second and third axes defines a scanning plane. In addition, the scanning apparatus can further include a sample stage configured to present a sample to the scanning plane, whereby the scanning head scans the sample.

In some embodiments, the invention features a scanning apparatus that includes a chassis; an actuator that moves along a first axis with respect to a chassis, that is optionally coupled, e.g., mechanically coupled, to the chassis with a restoring or damping element, and that comprises a moving coil actuator; an optical scanning head that is mechanically coupled to the actuator stage, that moves along a second axis that is the same as or substantially parallel to the first axis, that has a mass less than about one tenth that of the actuator, and that includes a lens and a mirror; optionally includes a translation stage configured to move the actuator and the optical scanning head together along a third axis, whereby movement of the optical scanning head along the second and third axes defines a scanning plane; a sample stage arranged to present a sample to the scanning plane, whereby the optical scanning head scans the sample; a displacement encoder configured to sense displacement of the optical scanning head along the second axis; and a controller that is electronically linked to the actuator, the translation stage (if present), the displacement encoder, and the optical scanning head, and that is programmed to: (i) actuate the actuator to move the optical scanning head in relation to displacement of the optical scanning head sensed by the displacement encoder along the second axis; (ii) move the translation stage (if present) along the third axis, whereby the optical scanning head is moved in the scanning plane; and (iii) operate the optical scanning head to scan the sample; wherein the optical scanning head and the actuator move along the first and second axes at different speeds.

In any of the scanning apparatuses described herein, the scanning apparatus can be a microarray scanner.

In another aspect, the invention features methods of reducing vibration in a scanning operation. These methods include obtaining a scanning apparatus as described herein; moving the actuator along the first axis at a first speed; and moving the scanning head along the second axis at a second speed such that the moving actuator functions as a counterbalance weight for the moving scanning head, thereby reducing vibration in the scanning apparatus by decoupling translation of the actuator from the chassis. In these methods, the first and second speeds can be the same or different, and the actuator can have a mass at least about ten times greater than a mass of the scanning head.

In these methods, additional steps can include automatically sensing displacement of the scanning head along the second axis, automatically actuating the actuator to move the scanning head along the second axis, and moving the actuator and the scanning head together along a third axis, whereby movement of the scanning head along the second and third axes defines a scanning plane.

In some embodiments, the methods include applying a restoring force or a damping force between the actuator stage and the chassis. For example, the restoring force or damping force can be applied by the above cited coupling element.

In some embodiments, the methods include sensing, e.g., automatically, a displacement of the optical stage along the second axis. For example, the displacement can be sensed by the above described displacement encoder.

In some embodiments, the methods include translating the optical stage in the scanning plane to scan a sample opposed to the scanning plane. The sample can be any suitable sample, for example, a microarray sample slide.

In various embodiments, the controller is programmed to automatically perform one or more of the preceding method steps.

In another aspect, the invention features scanning systems that include the new vibration control mechanisms described herein, and methods of using such scanning systems. For example, such scanning systems can be scanning microscopes and microarray scanners, such as an MDS Analytical Technologies GenePix® 4000B microarray scanner, which can be used for the acquisition and analysis of expression data from DNA microarrays, protein microarrays, tissue arrays, and cell arrays.

The apparatuses and methods described herein are practical, economical, and effective in reducing vibration in scanners, such as microarray gene chip scanners. Without the use of expensive high precision components, the apparatus and methods permit decoupling of vibrations from rapid or cyclical scanning movement which can reduce blurring and other scanning distortions, and can reduce potential damage to delicate optical or electrical components of such scanners. Thus, scan performance can be improved, the need for maintenance and calibration can be reduced, and apparatus lifetime can be improved.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
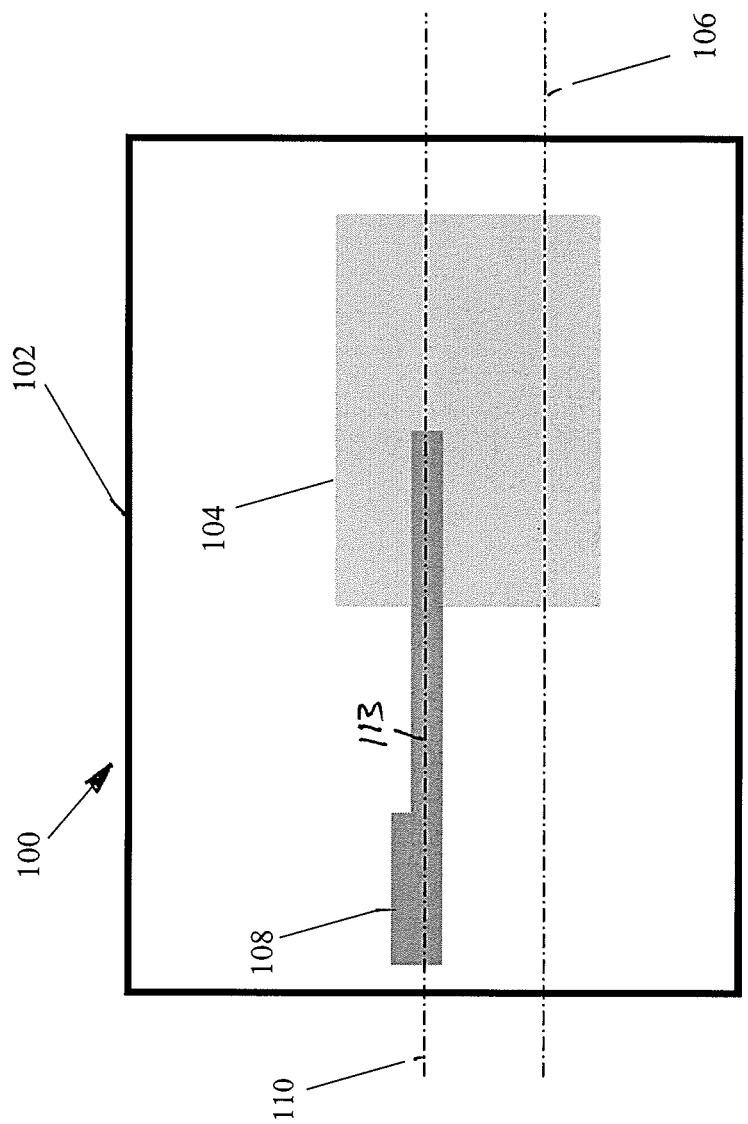
FIG. 1 is a top schematic view of an optical scanning apparatus.
Figure 2:
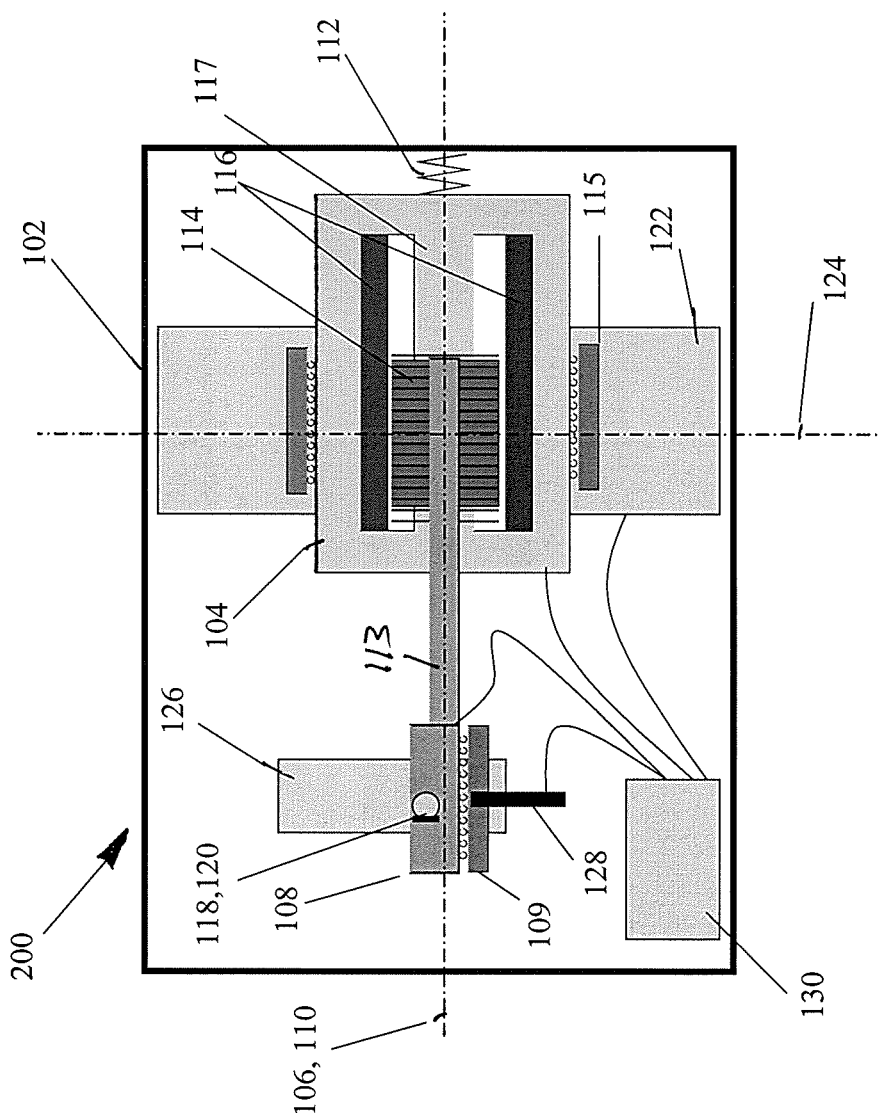
FIG. 2 is a top schematic diagram of an optical scanning apparatus that includes components that provide vibration control.

The new vibration control mechanisms and methods are realized by a set of additional components, which can, for example, be added to standard scanners, e.g., optical scanners. We will first describe the basic components of scanners, e.g., as shown in FIG. 1, and then the new components and features that are used to achieve the significantly enhanced vibration control, as shown in FIG. 2. The new mechanisms and methods described herein can be used in standard slide scanning systems, such as DNA microarray or gene chip microarray scanners, to significantly reduce vibration artifacts in the scanning of slides in an effective and economical manner. For example, the new mechanisms and methods can be used in the scanning systems described in U.S. Pat. Nos. 6,555,802 and 6,628,385, which are incorporated herein by reference in their entireties.

As shown in the top schematic view of FIG. 1, scanners 100 generally have two main components, a scanning head 108, e.g., an optical scanning head, which includes the optical components (such as a lens and mirror, see FIG. 2), and an actuator 104. Scanning apparatus 100 includes a chassis 102, and actuator 104, which is translatable along a first axis 106 with respect to chassis 102. Scanning head 108 is mechanically coupled to actuator 104 by means of a shaft 113 (which moves into and out of actuator 104 along a second axis 110, which is substantially parallel to first axis 106), and thus also translates along axis 110.

Actuator 104 and scanning head 108 can have the same or different masses. However, typically actuator 104 has a mass greater than the mass of scanning head 108, whereupon actuation, actuator 104 and scanning head 108 translate along first and second axes 106/110 at different speeds. For example, in some embodiments, the mass of actuator 104 is at least two times the mass of scanning head 108. In various embodiments, the mass of actuator 104 is between about 2 and 100 times, between about 10 and 100 times, between about 25 and 100 times, or between about 25 and 75 times the mass of the scanning head. In certain embodiments, the mass of the actuator is about 50 times the mass of the scanning head.

In general, actuator 104 can be in the form of a voice coil actuator, a piezoelectric actuator, a motor coupled to a crankshaft or cam, a pneumatic actuator, a motor with a lead screw, a motor with a capstan belt drive, a motor with a chain-drive, or the like. In certain embodiments, the actuator is a voice coil or linear motion coil actuator. These components can all be standard equipment.

The scanning head 108 can be an optical scanning head that typically includes one or more optical scanning elements such as a mirror, a lens, a light source, a filter, a light detector, and a light pipe. A light source can be, for example, a light emitting diode, a laser such as a diode laser, a quantum dot, a broadband source such as a xenon or halogen lamp, and the like. A light detector can be, for example, a charge coupled device (CCD), a photomultiplier tube, and the like. A light pipe can include, for example, an optical fiber. In some embodiments, the optical scanning head includes a combination of two or more of the preceding optical elements. These components are all well-known in this field.

Now that we have described the basic components, we will describe the new vibration control mechanism. As shown in the top schematic view of FIG. 2, the basic components are the same as in FIG. 1. In particular, optical scanning apparatus 100 includes a chassis 102, an actuator 104, and an optical scanning head 108, mechanically coupled to actuator 104 by means of a shaft 113, which translates along axis 110, here shown as coincident with first axis 106. Optical scanning head 108 translates on bearing mount 109 and is depicted in this embodiment as including a lens 118 and mirror 120, symbolized by the circle and dark line, respectively.

A key aspect of the vibration control system is that the "base" of the actuator 104, which includes the relatively heavy magnets 116 and armature 117, is not permanently attached to chassis 102 of apparatus 100, but is attached to an actuator translation stage 115, which includes bearings, e.g., magnet translation bearings, which permit the actuator 104 to translate freely on axis 106. In scanning apparatus 100, actuator 104 is depicted in this embodiment as a voice coil actuator with magnets 116 and wire coil 114.

In FIG. 2 the axis of motion 106 of actuator 104 is parallel to the axis of motion 110 of optical stage 108. The magnet translation bearings of the actuator translation stage 115 have to be strong to support the rather heavy (e.g., 1.5 kg) voice coil actuator 104, but do not need to have the same quality (in terms of straightness of motion, yaw, pitch, wobble, etc.) as the optical scanner head 108, which allows the use of rather inexpensive components to support translation of actuator 104, such as an RN-2 from Del-Tron Precision Inc. When current is passed through voice coil actuator 104, the force between the optical scanning head 108 and the "base" of actuator 104 represented by magnets 116 and armature 117, produces acceleration of optical scanning head 108 in one direction and acceleration of magnets 116 and armature 117 in the opposite direction. The acceleration is inversely proportional to the moving mass.

Actuator 104 can be coupled to chassis 102 with coupling element 112, which can provide a restoring force and/or a damping force. Typical coupling, restoring, or damping elements can include, for example, a spring, an elastic bumper, a magnetic field, or a shock absorber. As depicted in FIG. 2, an exemplary coupling element 112 is a metal spring.

In the embodiment shown in FIG. 2, scanning apparatus 200 also includes a translation stage 122 that can be used to translate actuator 104 and optical scanning head 108 together along a third axis 124, whereby translation of optical scanning head 108 along the second and third axes 110/124 defines a scanning plane. Scanning apparatus 200 also includes sample stage 126 that is configured to present a sample to a scanning plane, e.g., defined by the translation of optical scanning head 108 along second and third axes 110, 124. As noted, sample stage 126 needs to be scanned in two directions—along the axes 106 and 124. In general, there are two ways to scan the sample stage 126 along axis 124. One way is to move the sample stage 126 along axis 124 (with a standard mechanism that is not shown, but is well known in this field) while the optical scanning head 108 is moving along axis 106. The other way, as noted above, is to move actuator 104 along with optical scanning head 108 and shaft 113 by moving translation stage 122 along axis 124 with respect to a stationary sample stage 126. In this case, coupling element 112 could be connected to translation stage 122 instead of chassis 102 (see, e.g., FIG. 3 in this regard).

The sample can be any sample of interest that is suitable for scanning by the scanning apparatus, such as a microarray sample slide. In various embodiments, the sample is a slide configured to hold a biological or biochemical sample, for example, a histology sample slide, a DNA or RNA microarray sample slide, and the like. Thus, in various embodiments, the scanning apparatus is a microarray scanner.

Scanning apparatus 200 can also include a displacement encoder 128 configured to sense displacement of optical scanning head 108 along second axis 110. The encoder 128 can be located separately from the optical scanning head and can sense displacement according to motion of a displacement reference on the head. Encoder 128 could also be located, for example, on the optical scanning head itself, sensing displacement according to motion of the optical scanning head relative to a displacement reference that is separate from the head 108, e.g., affixed to chassis 102. The displacement reference can be any reference suited to the selected encoder, for example, a pattern such as a bar code or other pattern. In various embodiments, the displacement encoder is an optical encoder, a linear variable displacement transducer (LVDT) encoder, a laser differential interferometer, or an inductive proximity sensor. In certain embodiments, the displacement encoder is an optical encoder.

Scanning apparatus 200 also includes a controller 130 that is coupled to actuator 104, translation stage 122, displacement encoder 128, and optical scanning head 108. Controller 130 can be programmed to, for example, control a current to actuate actuator 104 to translate optical scanning head 108 according to displacement of head 108 sensed at displacement encoder 128 along second axis 110; translate translation stage 122 along third axis 124, whereby optical scanning head 108 is translated in a scanning plane defined by the second axis 110 and third axis 124; and operate optical scanning head 108 to scan the sample at sample stage 126, wherein the optical scanning head and the actuator translate along the first and second axes at different speeds.

Electronic control circuits control the current through the wire coil 114 based on information from displacement encoder 128 to provide a desired motion profile for scanning head 108. The movement is often cyclical in nature and is coupled to another slower movement of actuator 104 along axis 124, orthogonal to axis 110 of the scanning head movement, such that the two movements produce a scan of an area of a sample on sample stage 126.

In operation, when a current is passed through the actuator 104 by the control circuit 130, the force between the scanning head 108 and the armature 117 produces acceleration of the optical scanning head 108 in one direction and acceleration of the armature 117 in the opposite direction. The acceleration is inversely proportional to the moving mass. For example, the mass of the armature can be about 20 to 50 times larger than the mass of the optical scanning head 108, and thus the acceleration of the armature is 20 to 50 times smaller. The velocity and the displacement of the armature 117 are proportionally smaller as well, farther reducing the cost of the stage.

Since the force is applied between the actuator 104 and the moving scanning head 108, and is not applied to the instrument's chassis 102, there is essentially no vibration to couple to from the actuator to the instrument. In essence the armature of the actuator functions as a counterbalance weight for the moving scanning head. To make sure the armature 117 does not drift from it's nominal middle position (due to some imbalance of friction in the translation stage 115, for example), a week extension/compression spring 112 can be used, as well as stoppers (rubberized bumps) at the end of travel, centering the armature.

Figure 3:
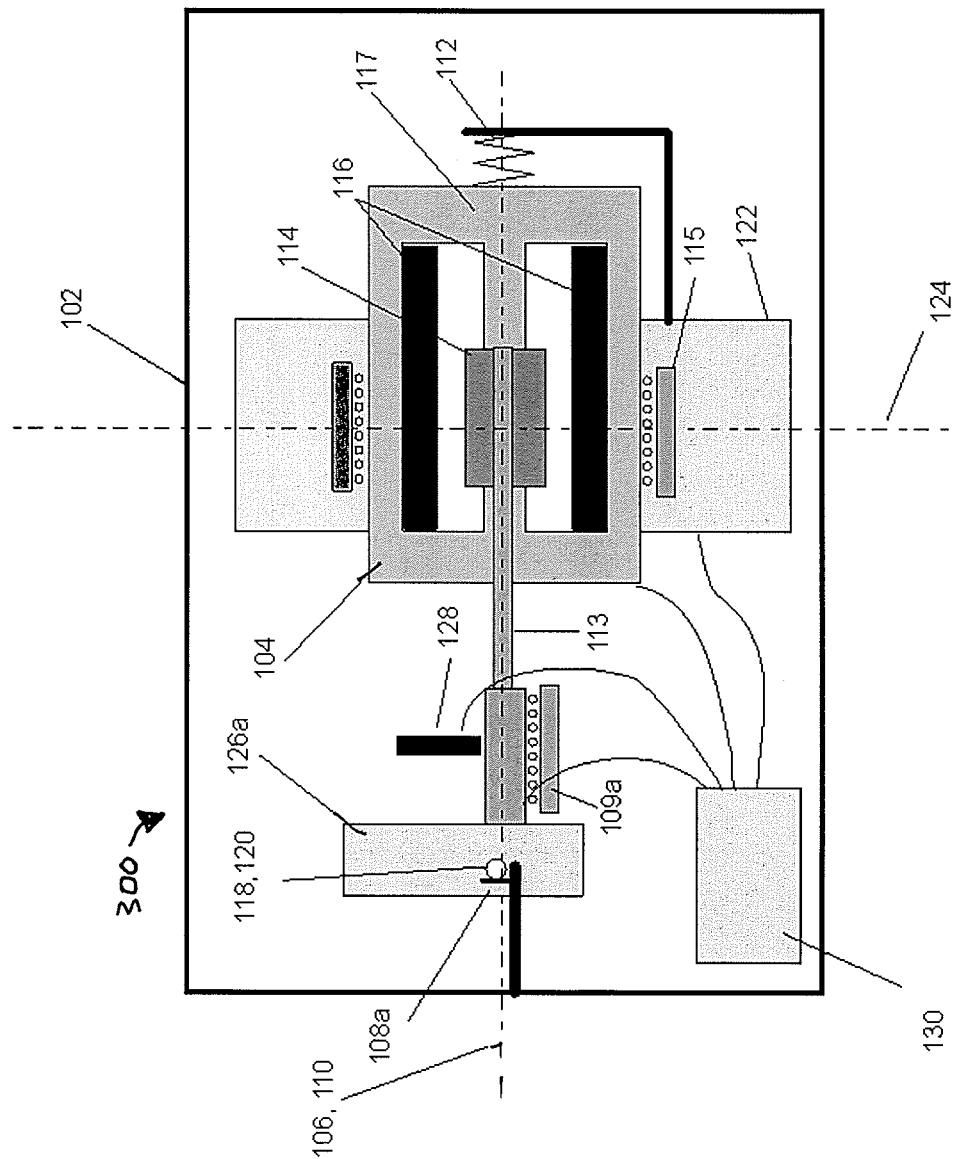
FIG. 3 is a top schematic diagram of an optical scanning apparatus that includes components that provide vibration control, where the sample is moved with respect to a stationary optical head.

FIG. 3 shows a different embodiment of scanner apparatus 300, in which optical head 108a (including a lens 118 and mirror 120) is fixed, e.g., by being attached to the chassis 102, and the sample stage 126*a* is mounted to the translation stage 109*a* to enable the sample to be moved back and forth with respect to the fixed optical head 108*a* by the actuator 104 along the axis 110 via shaft 113. As in the other embodiments, actuator 104 is mounted on translation stage 115 with, e.g., bearings, to act as a counterbalance to reduce the vibrations. To scan the sample in the other direction (e.g., along 124) the sample stage 126*a*, actuator 104, translation stage 115, etc. are translated along the axis 124 by translation stage 122. As shown in FIG. 3, in this case, coupling element 112 is connected to translation stage 122 instead of chassis 102.

EXAMPLES

The following examples are provided by way of illustration and are not intended to limit the invention.

Example 1

The Causes of Vibrations in Optical Scanners

To increase performance of optical scanners it is desirable to accelerate and decelerate the optical scanning head rapidly; the faster the better. However, these rapid accelerations and decelerations come at a price. The severe starting and stopping motions cause the chassis of such optical scanning devices to vibrate considerably, and these vibrations in turn have a detrimental impact on image clarity.

For example, assume an optical scanning head has an oscillatory motion of 15 Hertz, scans a length of 22.2 millimeters (mm), and has a ⅔ duty cycle (i.e., 22.2 milliseconds (ms) linear motion and 11.1 ms for deceleration and acceleration to reverse the direction of motion). The maximal linear speed of the optical scanning head is about 22.2 mm/22.2 ms=1 meter/second (m/s). The optical scanning head accelerates to this speed in 11.1/2=5.55 ms. The acceleration is then 1 m/s/5.55 ms=180 meters/second$^2$. Assuming that the moving optical scanning head has a weight of 0.07 kilograms (kg), the force required to produce such acceleration is about 12.6 Newtons.

Such force can be readily provided by actuators such as a voice coil actuator, but periodic application will cause significant vibration of the whole instrument. This vibration is coupled to the optical components in the instrument, producing blurring and other distortions of the collected image. The vibrations are a significant obstacle to increasing resolution and scanning speed.

Example 2

Reducing Vibrations in High Speed Optical Scanning

The optical scanning system shown in FIG. 2 is used to assess the reduction in overall chassis vibration using the new vibration control mechanisms described herein.

In one example of the new scanning apparatus, the total mass of magnets and the armature in the actuator is about 1.5 kg and the total mass of the optical scanning head is about 0.07 kg. Thus, the mass ratio is about 20:1; hence the acceleration of the magnets and armature of the actuator is twenty times smaller than that of optical scanning head 108. The velocity and the displacement of magnets and armature are proportionally smaller. For example, if the total travel of the optical scanning head is 40 mm, the travel of the magnets and armature is only 2 mm, farther reducing the cost of the actuator.

Since the force is applied between the actuator and optical scanning head, and not between the actuator and the instrument's chassis, vibration is significantly decoupled from the chassis. In essence, the actuator works as a counterbalance weight for the optical scanning head.

Consequently, compared to Example 1, vibration due to scanning is substantially decoupled from the chassis 102 of apparatus 200 in FIG. 2.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A scanning apparatus, comprising:
   a chassis;
   an actuator arranged to move along a first axis with respect to the chassis; and
   a scanning head, mechanically coupled to the actuator and arranged to move along a second axis that is the same as or substantially parallel to the first axis;
   wherein the scanning head and the actuator move along the first and second axes such that the moving actuator functions as a counterbalance weight for the moving scanning head, thereby reducing vibration in the scanning apparatus by decoupling translation of the actuator from the chassis.

2. The scanning apparatus of claim 1, wherein the actuator and scanning head move at different speeds.

3. The scanning apparatus of claim 1, wherein the actuator has a mass at least about ten times greater than a mass of the scanning head.

4. The scanning apparatus of claim 1, wherein the actuator comprises a voice coil actuator; a piezoelectric actuator; a motor coupled to a crankshaft or cam; a pneumatic actuator; a motor with a lead screw; a motor with a capstan belt drive; or a motor with a chain-drive.

5. The scanning apparatus of claim 1, wherein the actuator is coupled to the chassis with a coupling element.

6. The scanning apparatus of claim 5, wherein the coupling element comprises a spring, an elastic bumper, a magnetic field, or a shock absorber.

7. The scanning apparatus of claim 1, wherein the scanning head is an optical scanning head.

8. The scanning apparatus of claim 7, wherein the optical scanning head comprises a mirror and a lens.

9. The scanning apparatus of claim 1, further comprising a displacement encoder configured to sense displacement of the scanning head along the second axis.

10. The scanning apparatus of claim 1, further comprising a controller coupled to the actuator, wherein the controller is programmed to actuate the actuator to move the scanning head along the second axis.

11. The scanning apparatus of claim 9, further comprising a controller coupled to the actuator and the displacement encoder, wherein the controller is programmed to actuate the actuator to move the scanning head along the second axis according to displacement sensed at the displacement encoder.

12. The scanning apparatus of claim 1, further comprising a translation stage configured to move the actuator and the scanning head together along a third axis, whereby movement of the scanning head along the second and third axes defines a scanning plane.

13. The scanning apparatus of claim 12, further comprising a sample stage configured to present a sample to the scanning plane, whereby the scanning head scans the sample.

14. The scanning apparatus of claim 1, wherein the scanning apparatus is a microarray scanner.

15. A method of controlling vibration in a scanning operation, the method comprising:
   obtaining a scanning apparatus of claim 1;
   moving the actuator along the first axis at a first speed; and
   moving the scanning head along the second axis at a second speed such that the moving actuator functions as a counterbalance weight for the moving scanning head, thereby reducing vibration in the scanning apparatus by decoupling translation of the actuator from the chassis.

16. The method of claim 15, wherein the first and second speeds are different.

17. The method of claim 15, wherein the actuator has a mass at least about ten times greater than a mass of the scanning head.

18. The method of claim 15, wherein the actuator comprise a voice coil actuator; a piezoelectric actuator; a motor coupled to a crankshaft or cam; a pneumatic actuator; a motor with a lead screw; a motor with a capstan belt drive; or a motor with a chain-drive.

19. The method of claim 15, further comprising automatically sensing displacement of the scanning head along the second axis.

20. The method of claim 15, further comprising automatically actuating the actuator to move the scanning head along the second axis.

21. The method of claim 20, further comprising moving the actuator and the scanning head together along a third axis, whereby movement of the scanning head along the second and third axes defines a scanning plane.

22. A scanning apparatus, comprising:
   a chassis;
   an actuator that moves along a first axis with respect to a chassis, that comprises a moving coil actuator, and that is optionally coupled to the chassis with a restoring or damping element;
   an optical scanning head that is mechanically coupled to the actuator stage, that moves along a second axis that is the same as or substantially parallel to the first axis, that has a mass less than about one tenth that of the actuator, and that comprises a lens and a mirror; a sample stage arranged to present a sample to the scanning plane, whereby the optical scanning head scans the sample;
   a displacement encoder configured to sense displacement of the optical scanning head along the second axis; and
   a controller that is electronically linked to the actuator, the translation stage, the displacement encoder, and the optical scanning head, and that is programmed to: actuate the actuator to move the optical scanning head in relation to displacement of the optical scanning head sensed by the displacement encoder along the second axis; and operate the optical scanning head to scan the sample;
   wherein the optical scanning head and the actuator move along the first and second axes such that the moving actuator functions as a counterbalance weight for the moving scanning head, thereby reducing vibration in the scanning apparatus by decoupling translation of the actuator from the chassis.

* * * * *